(No Model.)

J. S. CAMPBELL.
ARTIFICIAL TOOTH.

No. 571,644.                    Patented Nov. 17, 1896.

Witnesses.
Geo. S. French
James W. Bevard

Inventor:
John S. Campbell
by Pattison and Nesbit
Attys

UNITED STATES PATENT OFFICE.

JOHN SMALLEY CAMPBELL, OF PARIS, FRANCE, ASSIGNOR TO THE DENTENAX COMPANY, LIMITED, OF LONDON, ENGLAND.

ARTIFICIAL TEETH.

SPECIFICATION forming part of Letters Patent No. 571,644, dated November 17, 1896.

Application filed October 15, 1895. Serial No. 565,766. (No model.)

*To all whom it may concern:*

Be it known that I, JOHN SMALLEY CAMPBELL, a citizen of the United States of America, residing at Paris, in the Republic of France, have invented an Improved Backing for Artificial Teeth, of which the following is a specification.

My invention has reference to a new backing for use with teeth having projections or pins at their lingual sides.

Figure 1:
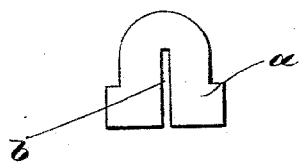
Figure 2:
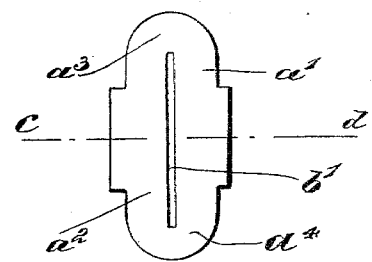
Figure 3:
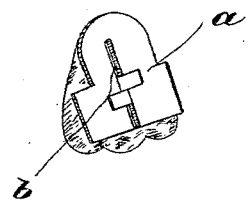

Figure 1 shows in elevation a backing according to my invention; and Fig. 2 is a like view showing a plate specially formed and perforated to produce, when divided, two of my improved backings. Fig. 3 shows one of my backings locked to a tooth.

Referring to Fig. 1, $a$ is a metal plate, such as a piece of platinum, whose upper end is suitably shaped to suit the particular form of tooth to which it is to be applied. $b$ is a slot formed in this plate, and which converts the plate into an adjustable backing, so that it may be moved up or down in relation to a tooth in order to be fitted to a plate even after the backing has been locked to the tooth by splitting and spreading a pin or pins or projection or projections of the tooth. (See, for example, Fig. 3.) Such backings may be made a cheaper article of manufacture by making two of them in one piece of plate, as shown in Fig. 2. In this case I cut, stamp, or punch the metal plate to shape, (the external shape depending on the forms of the teeth, as well understood,) with two longitudinal parts $a'$ $a^2$, a slot or long hole $b'$ separating said parts, and two connecting parts $a^3$ $a^4$, so that when the plate is cut in the line $c$ $d$ or a line parallel thereto there will be two backings, whereof one may be shorter than the other or both may be the same length, as may be required, according as the cut is made nearer to one end or in the middle.

To illustrate the mode of keeping the backing against the lingual side of the tooth while fitting, I have taken as an example a tooth made according to my Patent No. 465,460, dated December 22, 1891, with a platinum pin projecting from the tooth, which, as already stated, is split and separated and bent to either side.

When using my improved backing with a tooth having no projecting pin, the backing may be held by strong sticky wax. The slot allows the solder to pass in and unite the backing to the platinum in the tooth. When using my backing with common pin-teeth where one pin is above the other, the two pins may be bent to opposite sides.

These backings can be made as an article of manufacture of different quality of metal in readiness for use whenever required, thus saving valuable time and material.

By my invention I am enabled to dispense with the use of the old plate-punches commonly employed to perforate teeth-backings, which is of great advantage because, as is well known, the old system of making two holes into each backing is tedious and uncertain and requires a special backing made for each tooth, and should the holes be made too high, too low, too far to either side, or too wide apart another backing must be made, and the one incorrectly perforated goes into scrap material at a great loss of time and money, which may be saved by the use of my invention.

What I claim is—

1. As an improved article of manufacture, a tooth-backing consisting of a metal plate having a narrow vertical slot therein adapted to receive the stem of a headed pin or plate extending from the back of a tooth whereby said tooth is capable of vertical adjustment on said backing, substantially as described.

2. As an improved article of manufacture, a tooth-backing having a slot open at one end, adapted to receive the stem of a headed pin or plate and to be placed upon the tooth by a sliding movement, substantially as described.

In testimony whereof I have signed my name to this specification in the presence of two subscribing witnesses.

JOHN SMALLEY CAMPBELL.

Witnesses:
W. LLOYD WISE,
F. J. BROUGHAM.